(12) United States Patent
Kumar et al.

(10) Patent No.: US 11,138,609 B2
(45) Date of Patent: Oct. 5, 2021

(54) METHODS, SYSTEMS AND COMPUTER PROGRAM PRODUCTS FOR IDENTITY AUTHENTICATION FOR PAYMENT CARD BASED PAYMENT TRANSACTIONS

(71) Applicant: Mastercard International Incorporated, Purchase, NY (US)

(72) Inventors: Gaurav Kumar, Ahmedabad (IN); Saugandh Datta, Greater Noida (IN); Nibedan Kumar Bhawsinka, Odisha (IN)

(73) Assignee: Mastercard International Incorporated, New York, NY (US)

( * ) Notice: Subject to any disclaimer, the term of this patent is extended or adjusted under 35 U.S.C. 154(b) by 0 days.

(21) Appl. No.: 16/842,177

(22) Filed: Apr. 7, 2020

(65) Prior Publication Data

US 2020/0320537 A1   Oct. 8, 2020

(30) Foreign Application Priority Data

Apr. 8, 2019 (IN) .............................. 201911014086

(51) Int. Cl.
*G06Q 20/40* (2012.01)
*G06Q 20/38* (2012.01)
(Continued)

(52) U.S. Cl.
CPC ... *G06Q 20/40145* (2013.01); *G06K 7/10366* (2013.01); *G06Q 20/3415* (2013.01); *G06Q 20/3825* (2013.01)

(58) Field of Classification Search
CPC ......... G06Q 20/40145; G06Q 20/3825; G06Q 20/3415; G06Q 20/355; G06Q 20/3674; G06K 7/10366; G07F 7/12; G07F 7/1016
See application file for complete search history.

(56) References Cited

U.S. PATENT DOCUMENTS 6,655,585 B2 * 12/2003 Shinn ..................... G07C 9/257
                                                                 235/382
9,355,236 B1   5/2016 Kratz et al.
(Continued)

FOREIGN PATENT DOCUMENTS

EP        3376454 A      9/2018

OTHER PUBLICATIONS

Henniger, et al.; Extending EMV Payment Smart Cards with Biometric On-Card Verification; 3rd Policies and Research in Identity Management (IDMAN); pp. 121-130; Apr. 2013 DOI: 10.1007/978-3-642-37282-7_12.
(Continued)

*Primary Examiner* — Clifford B Madamba
(74) *Attorney, Agent, or Firm* — Pramudji Law Group PLLC; Ari Pramudji

(57) ABSTRACT

The invention provides methods, systems and computer program products for identity authentication for payment card based payment transactions. A payment card may be configured for payor identity authentication for the purpose of an electronic payment transaction(s), and may comprise (i) sensors to measure card handling parameters, (ii) an authentication signature generator, configured to generate and store a biometric identity signature associated with an authorized cardholder—which signature is based on a first set of card handling parameter data received from the sensors, (iii) a card handling data comparator configured to receive a second set of card handling parameter data from the sensors, retrieve the biometric identity signature associated with the authorized cardholder, and compare the second set of card handling parameter data with data extracted from the retrieved biometric identity signature, and (iv) an authentication decision generator configured to generate an identity authentication decision based on the comparison.

17 Claims, 10 Drawing Sheets

(51) Int. Cl.
*G06Q 20/34* (2012.01)
*G06K 7/10* (2006.01)

(56) References Cited

U.S. PATENT DOCUMENTS

| | | | |
|---|---|---|---|
| 2002/0095587 A1* | 7/2002 | Doyle | G07F 7/1008 |
| | | | 713/186 |
| 2013/0108125 A1* | 5/2013 | Storm | G06K 9/00026 |
| | | | 382/124 |
| 2013/0228616 A1 | 9/2013 | Bhosie et al. | |
| 2015/0213351 A1 | 7/2015 | Wyatt | |
| 2016/0226837 A1* | 8/2016 | Kim | H04W 12/06 |
| 2017/0124445 A1 | 5/2017 | Howard | |
| 2019/0080326 A1* | 3/2019 | Trivedi | G06Q 20/4012 |

OTHER PUBLICATIONS

Office Action from Intellectual Property India; IN 201911014086; dated Jan. 28, 2021.

\* cited by examiner

METHODS, SYSTEMS AND COMPUTER PROGRAM PRODUCTS FOR IDENTITY AUTHENTICATION FOR PAYMENT CARD BASED PAYMENT TRANSACTIONS

FIELD OF THE INVENTION

The present invention relates to the domain of payment card transaction authentication, and more particularly to methods, systems and computer program products for implementing card handling parameter data based authentication of payment card transactions.

BACKGROUND OF THE INVENTION

Electronic payment transactions involving a payment card (e.g. a credit card or a debit card) are widely used. FIG. 1 illustrates a conventional payment card 100 of a type commonly used—comprising a plastic substrate having card information printed thereon (for example, the card holder's name, validity period, issuer name, payment institution name and a card verification value or card verification code), and a magnetic stripe (not shown) disposed on the surface of the substrate—which encodes and stores all or part of the printed card information, along with additional information, a microprocessor or smartchip that is configured to interact with point-of-sale (POS) terminal, and/or a wireless device for enabling a POS terminal having wireless capabilities to receive and/or send data from/to the payment card.

A common type of electronic payment transaction involves initiating payment by presenting the payment card at a POS terminal, and inputting the transaction amount and payor authentication information (for example a personal identification number (PIN), password, passcode, or one-time password (OTP)) at the point-of-sale (POS) terminal. The transaction amount and payor authentication information is electronically forwarded (through an acquirer associated with the POS terminal and a centralized payment network associated with the payment card) to an issuer associated with the payor's payment account—whereafter the issuer decides whether to authorize the transaction, based on (i) a determination that the transaction amount is less than an available balance associated with the payor's payment account, and (ii) successful authentication of the payor's identity using the received authentication information.

It has been found that the process steps involving input of authentication information and/or transaction amount information at the POS terminal is generally considered inconvenient and interferes with the overall payment experience. Additionally, the time involved in transaction authorization at the issuer backend is a further inconvenience which payors are faced with from time to time. Yet further, traditional authentication systems that rely on passwords, passcodes or one-time-passwords (OTPs) are increasingly been found to be insecure as the sophistication of technologies for maliciously intercepting, deducing or spoofing such passwords, passcodes or OTPs increases over time.

There is accordingly a need for a solution that enables authorization of payment transactions in a manner that improves payment card security as well as the user experience.

SUMMARY

The invention provides methods, systems and computer program products for implementing card handling parameter(s) based authentication of payment card transactions.

The invention comprises a payment card configured for payor identity authentication for the purpose of an electronic payment transaction(s). The payment card comprises (i) one or more sensors configured to measure card handling parameters associated with the payment card, (ii) a processor implemented authentication signature generator, configured to (a) generate a biometric identity signature associated with an authorized cardholder corresponding to the payment card, wherein the biometric identity signature is generated based on a first set of card handling parameter data received from the one or more sensors, and (b) retrievably store the generated biometric identity signature in a memory, (iii) a processor implemented card handling data comparator configured to (a) receive a second set of card handling parameter data from the one or more sensors; (b) retrieve the biometric identity signature associated with the authorized cardholder from the memory; and (c) compare the second set of card handling parameter data with data extracted from the retrieved biometric identity signature, and (iv) a processor implemented authentication decision generator configured to generate an identity authentication decision based on the comparison between the second set of card handling parameter data with data extracted from the retrieved biometric identity signature.

The authentication decision generator may be configured such that the generated identity authentication decision is communicable to a payment card reader with which the payment card interfaces for the purposes of implementing the electronic payment transaction.

In an embodiment of the payment card, the card handling data parameters may comprise one or more of motion, velocity or trajectory of the payment card, and grip characteristic parameters defining a applied by a payor to the payment card.

In a particular embodiment, the grip characteristic parameters may include one or more of grip surfaces, grip surface area, grip pressure, grip duration and grip temperature.

At least one of the one or more sensors may comprise any of an accelerometer, a gyroscope, a magnetometer, an altimeter, a GPS receiver, a contact sensor, a grip sensor, pressure sensor, capacitive touch sensor, galvanic skin response sensor, temperature sensor or any combination thereof.

The biometric identity signature associated with the authorized cardholder corresponding to the payment card may, in embodiment be generated responsive to confirmation that the first set of card handling data parameters corresponds to a change of state of the payment card that has been caused by the authorized cardholder.

The confirmation that the first set of card handling data parameters to a change of state of the payment card that has been caused by the authorized cardholder may be based on a successful identity authentication of the authorized cardholder's identity at a payment card reader with which the payment card interfaces.

In an embodiment of the payment card, the second set of card handling data parameters comprises card handling data parameters detected by the one or more sensors within a defined duration immediately preceding a card based transaction event.

The payment card may be configured such that the identity authentication decision may be one of an identity match decision and an identity non-match decision.

The invention additionally comprises a method for payor identity authentication for the purpose of a payment card based electronic payment transaction(s), wherein the payment card comprises a processor, a memory, and one or more sensors configured to measure card handling parameters associated with the payment card. The method comprises (i) generating a biometric identity signature associated with an authorized cardholder corresponding to the payment card, wherein the biometric identity signature is generated based on a first set of card handling parameter data received from the one or more sensors, (ii) retrievably storing the generated biometric identity signature in the memory, (iii) receiving a second set of card handling parameter data from the one or more sensors, (iv) retrieving the biometric identity signature associated with the authorized cardholder from the memory, (v) comparing the second set of card handling parameter data with data extracted from the retrieved biometric identity signature, and (vi) generating an identity authentication decision based on the comparison between the second set of card handling parameter data with data extracted from the retrieved biometric identity signature.

In an embodiment of the method the generated identity authentication decision is communicated to a payment card reader with which the payment card interfaces for the purposes of implementing the electronic payment transaction.

In a particular method embodiment, the card handling data parameters comprise one or more of motion, velocity or trajectory of the payment card, and grip characteristic parameters defining a applied by a payor to the payment card. Grip characteristic parameters may include one or more of grip surfaces, grip surface area, grip pressure, grip duration and grip temperature.

In embodiments of the method, least one of the one or more sensors comprises any of an accelerometer, a gyroscope, a magnetometer, an altimeter, a GPS receiver, contact sensor, a grip sensor, pressure sensor, capacitive touch sensor, galvanic skin response sensor, temperature sensor or any combination thereof.

In a further embodiment, the biometric identity signature associated with the authorized cardholder corresponding to the payment card may be generated responsive to confirmation that the first set of card handling data, parameters corresponds to a change of state of the payment card that has been caused by the authorized cardholder.

In a particular embodiment, the confirmation that the first set of card handling data parameters corresponds to a change of state of the payment card that has been caused by the authorized cardholder is based on a successful identity authentication of the authorized cardholder's identity at a payment card reader with which the payment card interfaces.

The second set of card handling data parameters of the method, may comprise card handling data parameters detected by the one or more sensors within a defined duration immediately preceding a card based transaction event.

In a method embodiment, the identity authentication decision is one of an identity match decision and an identity non-match decision.

The invention additionally provides a computer program product for implementing pre-authorized payment transactions, comprising a non-transitory computer usable medium having computer readable program code embodied therein, the computer readable program code comprising instructions for implementing the steps of (i) generating a biometric identity signature associated with an authorized cardholder corresponding to the payment card, wherein the biometric identity signature is generated based on a first set of card handling parameter data received from the one or more sensors, (ii) retrievably storing the generated biometric identity signature in the memory, (iii) receiving a second set of card handling parameter data from the one or more sensors, (iv) retrieving the biometric identity signature associated with the authorized cardholder from the memory, (v) comparing the second set of card handling parameter data with data extracted from the retrieved biometric identity signature, and (vi) generating an identity authentication decision based on the comparison between the second set of card handling parameter data with data extracted from the retrieved biometric identity signature.

The invention additionally provides computer program products implementing pre-authorized payment transactions, comprising a non-transitory computer usable medium having computer readable program code embodied therein, the computer readable program code comprising instructions for implementing any of the method embodiments described in the disclosure herein.

BRIEF DESCRIPTION OF THE ACCOMPANYING DRAWINGS

DETAILED DESCRIPTION

The invention provides methods, systems and computer program products for implementing card handling parameter(s) based authentication of payment card transactions.

For the purposes of the present invention, the following terms shall be understood to have the corresponding meanings provided below:

"Acquirer" shall mean a business (e.g., a financial institution or a merchant bank) that contracts with a merchant to coordinate with the issuer network of a customers' payment card.

"Acquirer network" shall refer to a communication network, including hardware, software and other equipment used by an acquirer to transmit and process card based transactions and information related to merchants, customers, payment cards and transactions.

"Payor", "Cardholder" or "Customer" shall mean an authorized payment card user who is making a purchase or effecting an electronic transaction with a payment card.

"Payment network" shall refer to the intermediary between the merchant's acquirer and the customer's issuer (for example, Mastercard® or Visa®). The payment network primarily coordinates payment card transactions between acquirers and issuers, and additionally coordinates clearing and settlement services to transfer payments from issuers to merchants.

"Issuer" shall mean a financial institution that issues payment cards and maintains a contract with a customer or card holder for repayment or settlement of purchases made on the payment card.

"Issuer network" shall refer to a communication network, including hardware, software and other equipment used by an issuer to transmit and process payment card transactions and information related to customers, payment cards and transactions.

"Merchant" or "Payee" shall mean an authorized acceptor of payment cards for the payment of goods or services sold by the merchant.

"Payment card" shall mean a card associated with a payment account that may be provided to a merchant in order to fund a financial transaction via the associated payment account. Payment cards may include credit cards, debit cards, charge cards, stored-value cards, prepaid cards, fleet cards, virtual payment numbers, virtual card numbers, controlled payment numbers, etc.

"Payment account" shall mean any account that may be used for the purposes of effecting an electronic payment or electronic transaction, and shall include any electronic transaction account, payment card account, bank account or electronic wallet account.

Figure 1:
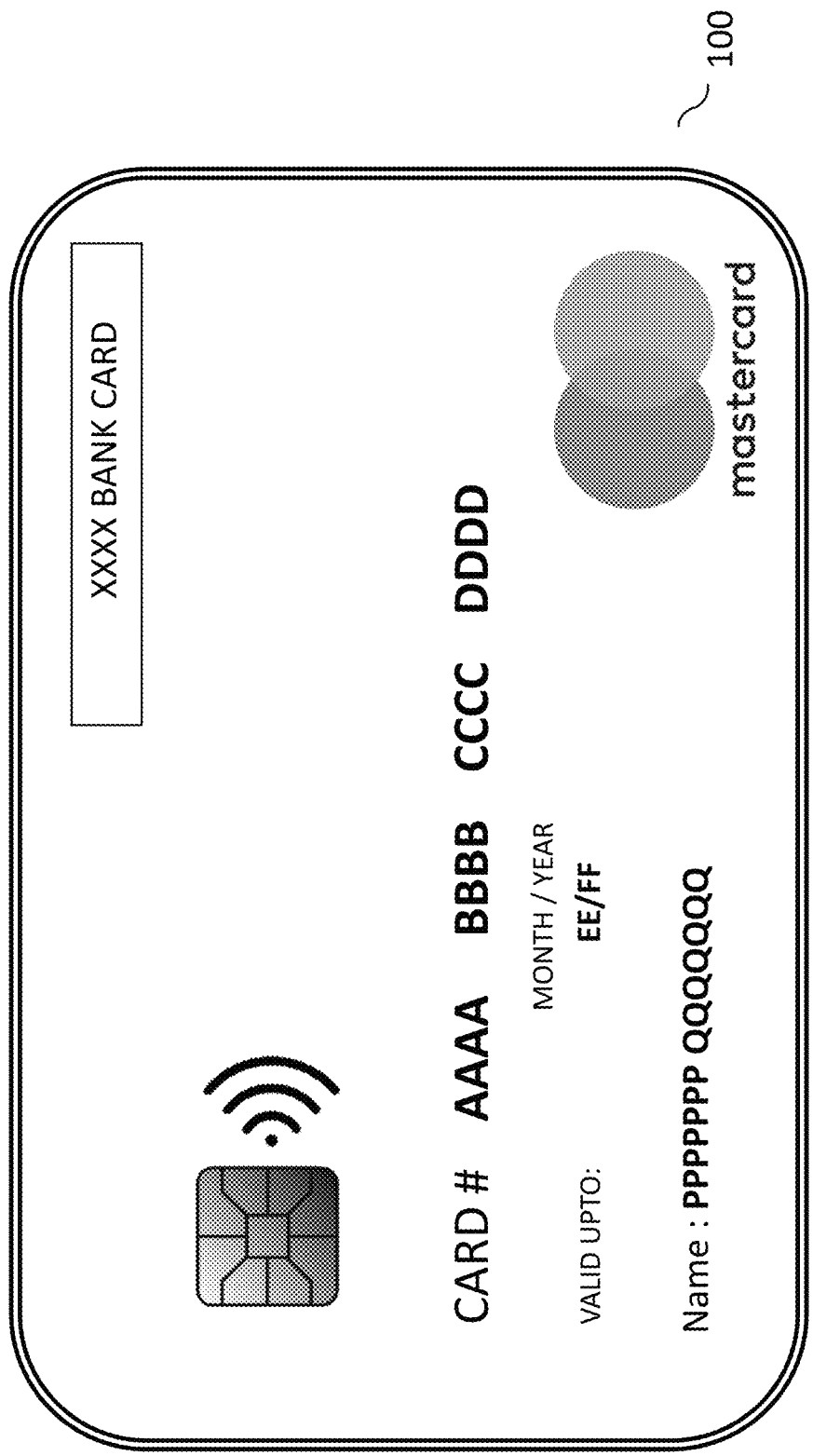
FIG. 1 illustrates a conventional payment card.
Figure 2:
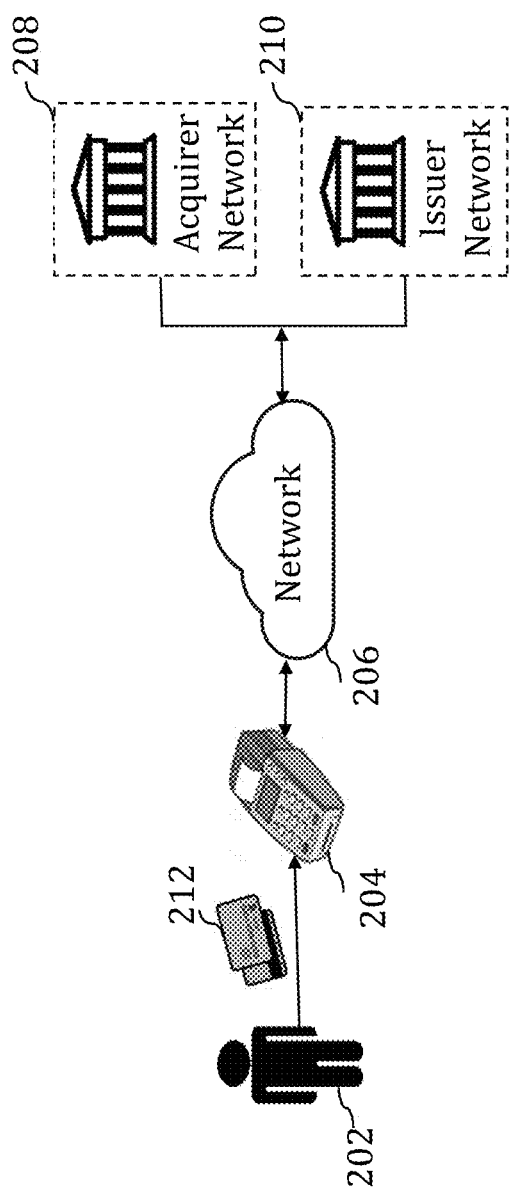
FIG. 2 illustrates a prior art system environment for implementing payment card based transactions through a POS terminal.

FIG. 2 illustrates a prior art system environment 200 for implementing electronic payment transactions. System environment 200 comprises a payor 202 having a payment card 212 (for example a credit card or debit card). Payor 202 may initiate payment transactions using payment card 212 through a POS terminal 204—for example by swiping a credit card (the payment card) at a credit card machine (the POS terminal). POS terminal 204 is communicably coupled to network 206 (which network may comprise a payment network or a data network) and through network 206 to acquirer network 208. Network 206 is also communicably coupled to issuer network 210.

Figure 3:
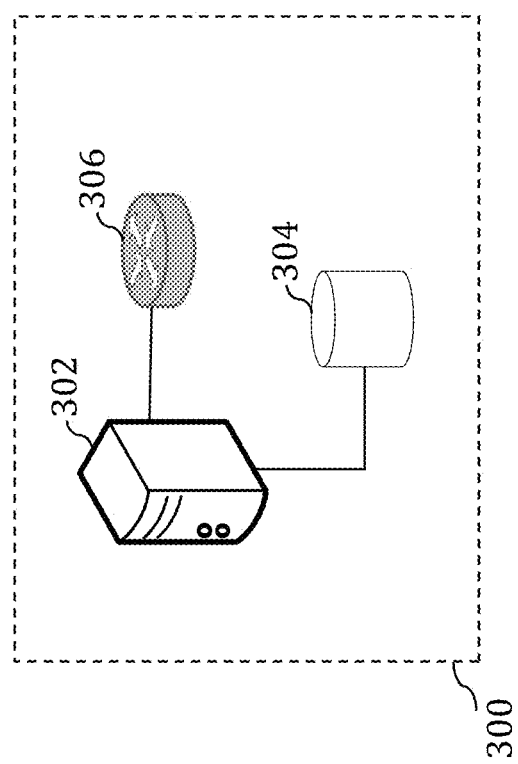
FIG. 3 illustrates an exemplary system configuration of a type that may be implemented within an acquirer network or an issuer network.

One or both of acquirer network 208 and issuer network 210 may in certain embodiments be configured in the form of the exemplary network 300 illustrated in FIG. 3—comprising a network server 302, network database 304 and interface gateway 306.

In a specific embodiment, wherein network 300 is implemented within acquirer network 208, network server 302 may be configured to receive and process information relating to payment card transactions. In an embodiment, the network server 302 may receive or process transactions received only from merchants having a merchant account with the acquirer—which determination may be made based on information retrieved from the acquirer network database 304. In such embodiments interface gateway 306 may include a hardware or software network gateway configured to enable the acquirer network 208 to communicate with network 206.

In an embodiment where network 300 is implemented within issuer network 210, network server 302 may be configured to receive and process information relating to payment card transactions. In an embodiment, the network server 302 may only receive or process transactions related to payee accounts that are maintained with the issuer—which determination may be made based on information retrieved from issuer network database 304. Interface gateway 306 may include a hardware or software network gateway configured to enable issuer network 310 to communicate with network 306.

Figure 4:
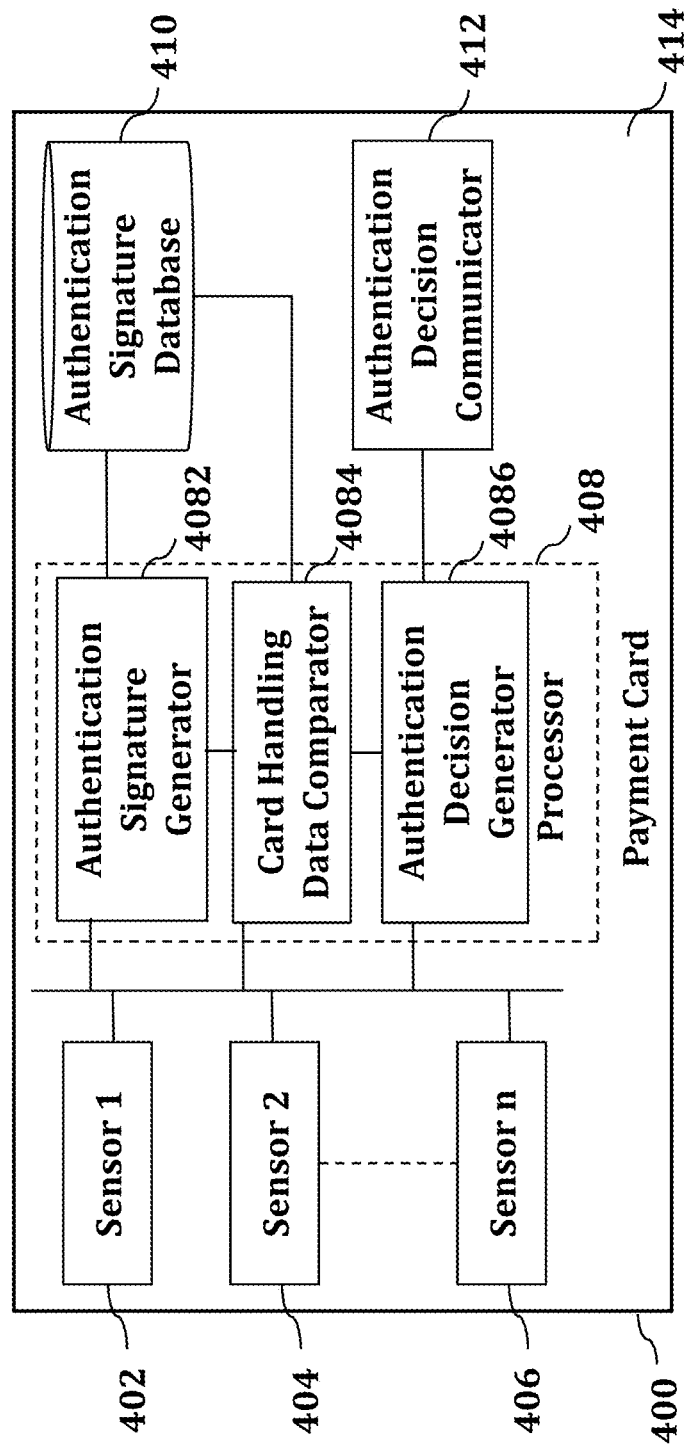
FIG. 4 illustrates an exemplary payment card configured to implement card handling data parameter based authentication in accordance with the present invention.

FIG. 4 illustrates an exemplary payment card 400 configured to implement card handling parameter data based authentication in accordance with the present invention. Payment card 400 may include a substrate 414 having (i) sensors 1 to n (402, 404, 406), (ii) processor 408 (for example an integrated circuit or smart chip based processor) configured to implement an authentication signature generator 4082, card handling data comparator 4084, and authentication decision generator 4086, (iii) authentication signature database 410 and (iv) authentication decision communicator 412.

Payment card substrate 414 forms the physical structure or housing for payment card 400. The substrate 414 may have dimensions required for the specific payment card and may include or may be formed of a plastic material, for example, polyvinyl chloride, polyethylene terephthalate based polyester, acrylonitrile butadiene styrene, polycarbonate etc. Lettering, characters and/or logos associated with a card issuing bank may be written or printed on an outside surface of the substrate 414. In certain embodiments, a primary account number (PAN), validity period information and/or an expiration date may be embossed and/or printed on the outer surface of the substrate 414. The payment card substrate is configured to house the various other components of payment card 400 that are shown in FIG. 4.

Substrate 414 may additionally include a magnetic stripe adhered to or otherwise attached to the surface of the substrate 414. According to various embodiments, card information may be encoded within the magnetic stripe, such that when the magnetic stripe is read by or swiped past a magnetic reading head, card information may be transferred from the magnetic strip (or the card) to the reader.

Any (or preferably all) of sensors 1 to n (402 to 406) within substrate 414 may comprise sensors configured to detect and/or measure one or more card handling parameters. For the purposes of the present invention, card handling parameters may include any data parameter(s) that describe and/or quantify handling of a payment card by a user or card holder, and may include without limitation parameters corresponding to (i) motion, including linear motion, angular motion, velocity and/or trajectory of the payment card—for example, data parameters measured by any of an accelerometer, a gyroscope, a magnetometer, an altimeter, a GPS receiver, or any combination thereof and (ii) grip applied by a user to the payment card, including any of grip surfaces, grip surface area, grip pressure, grip duration, grip temperature, or other grip characteristics that define or describe a manner in which a payment card is gripped or held by a user. In specific embodiments of the invention, sensors 1 to n (402 to 406) comprise any of (i) a sensor configured to detect and record parameters corresponding to any of motion, velocity and/or trajectory of the payment card—for example, any of an accelerometer, a gyroscope, a magnetometer, an altimeter, GPS receiver, or any combination thereof and (ii) a contact sensor, configured to detect and record parameters corresponding to a grip applied by a user to the payment card—for example, a grip sensor, pressure sensor, capacitive touch sensor, galvanic skin response sensor, temperature sensor or any combination thereof.

Processor 408 may in certain embodiments comprise an electronic chip or integrated circuit that is attached to or otherwise included within substrate 414. The processor 408 may be embedded within substrate 414 of payment card 400 during a manufacturing process for payment card 400. According to various exemplary embodiments, card information corresponding to the payment card 400 or payment account information corresponding to a payment account linked to payment card 400 may be stored within a storage or memory of the processor 408. For example, the card information or payment account information may include a personal account number, a validity duration or an expiration date, and the like.

The processor 408 may be capable of transferring the card information or payment account information to a POS terminal or a reader. For example, where processor 408 is implemented by way of an electronic chip, the electronic chip may include one or more electrical contacts that are configured to be contacted by a reader to form a circuit connection enabling data stored on the electronic chip to be transferred to the reader. As another example, when the processor 408 is implemented in the form of an electronic chip, the electronic chip may communicate with a payment terminal or a reader wirelessly and without contact, for example, using a radio wave transmission such as a contactless 13.56 MHz communication, a magnetic field transmission, and the like. In some cases, when the processor 408 is implemented in the form of an electronic chip, the electronic chip may include both a storage and a processor enabling the chip to electronically communicate either through contact or contactless-ly with a POS terminal or with a reader. In certain embodiments, the electronic chip may be configured to implement one or more of authentication signature generator 4082, card handling data comparator 4084 and authentication decision generator 4088, to retrieve authentication signature data from authentication signature database 410, and to communicate an authentication decision to a POS terminal or to a reader through an authentication decision communicator 412.

The functionality of authentication signature generator 4082, card handling data comparator 4084 and authentication decision generator 4086, authentication signature database 410, and authentication decision communicator 412 is discussed in more detail in connection with the methods of the present invention described below. In brief however, (i) authentication signature generator 4082 may be configured to generate a biometric identity template or a biometric identity signature corresponding to a cardholder—which biometric identity template or signature may be based on one or more card handling characteristics of the card holder, and may be stored in authentication signature database 410, (ii) card handing data comparator 4084 may be configured to receive card handling data parameters received from sensors within payment card 400 in a time window corresponding to a payment transaction and compare the received card handling data parameters with data extracted from a biometric identity template or signature corresponding to the authorized cardholder of payment card 400 and that is stored in authentication signature database 410, and (iii) authentication decision generator 4086 may be configured to generate an identity authentication decision based on the results of a data comparison executed by card handling data comparator 4084. The generated identity authentication decision may thereafter be communicated by authentication decision communicator 412 to a POS terminal or to a reader or other device at which payment card 400 is being used for the purposes of implementing a payment transaction.

Figure 5:
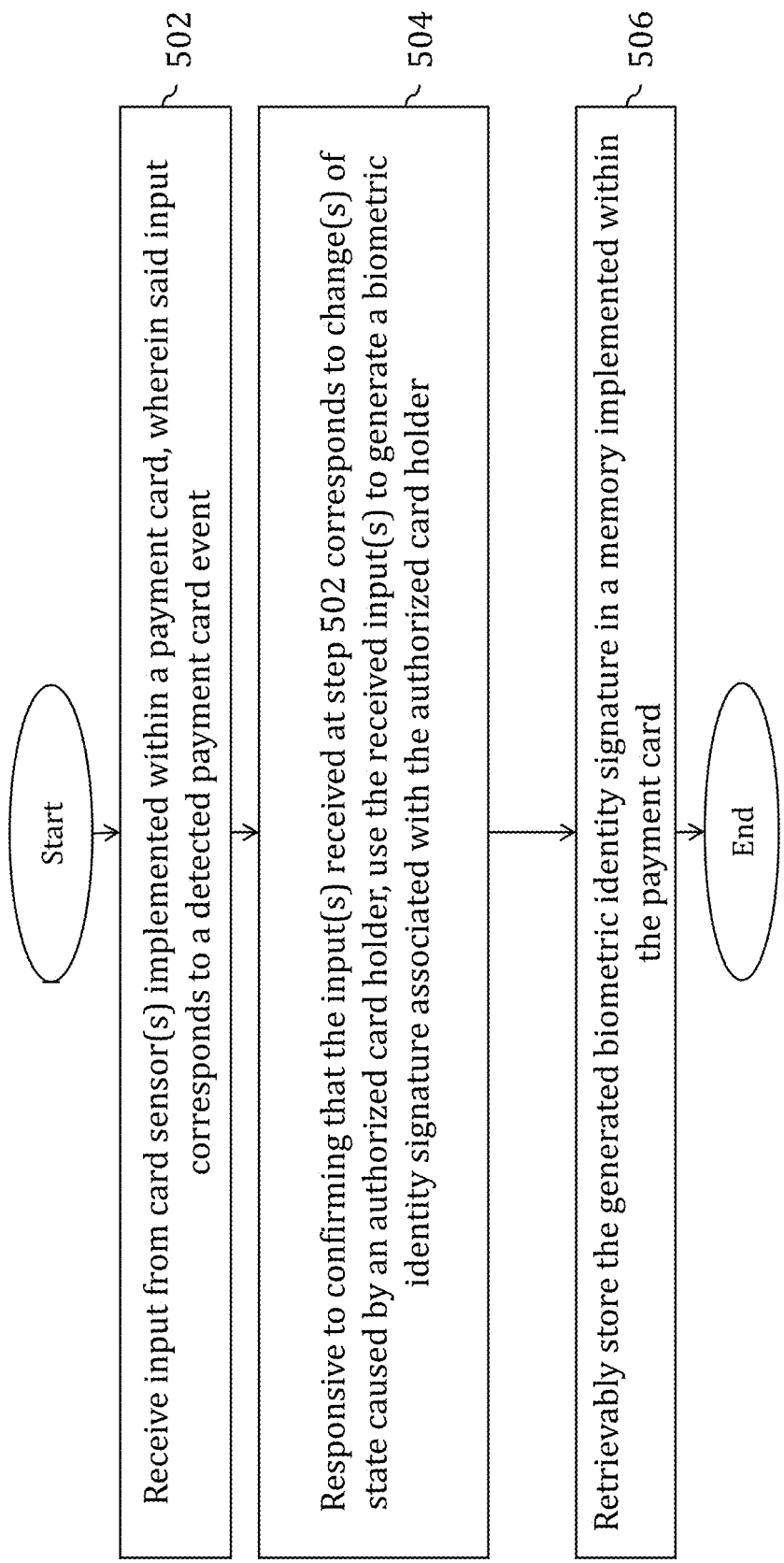
FIG. 5 is a flowchart illustrating a method for generating a card handling data parameter based authentication signature for cardholder identity authentication.

FIG. 5 is a flowchart illustrating a method for generating a card handling parameter data based authentication signature for cardholder identity authentication. It would be understood that the method of FIG. 5 may be implemented within payment card 400 of FIG. 4.

Step 502 comprises receiving input from one or more card sensors 402 to 406 implemented within payment card 400—wherein said input corresponds to a detected payment card event. In an embodiment of the invention, the input at step 502 may be received at processor 408, or more specifically at authentication signature generator 4082.

The input received at step 502 may comprise one or more card handling data parameters detected by the one or more card sensors 402 to 406—and may without limitation, comprise card handling data parameters corresponding to any of motion, velocity and/or trajectory of the payment card, grip applied by a user to the payment card, grip surfaces, grip surface area, grip pressure, grip duration, grip temperature, or other grip characteristics.

The detected payment card event with which the received inputs are associated may comprise any one or more predefined events associated with a payment card. Without limitation, said events may include, gripping or handling of the payment card, a payment card swipe event, removal of the payment card from a wallet or other enclosure, activation of a payment card by a specific card activating action on the part of a user, change in orientation, motion or trajectory of the payment card, or any other definable or measurable change in state associated with a payment card. In an embodiment, the inputs received at step 502 may comprise sensor inputs received within a defined time window before, during or after the detected payment card event.

At step 504, responsive to confirming that the input(s) received at step 502 corresponds to change(s) of state caused by the authorized cardholder for the payment card, authentication signature generator 4082 generates a biometric identity signature based on the received input(s). In an embodiment of the invention, the biometric identity signature may be generated based on the received input(s) as well as based on data retrieved from a biometric identity signature associated with the authorized cardholder that has been generated previously in on an earlier executed iteration of the method of FIG. 5.

It would be understood that the step of confirming whether the input(s) received at step 502 corresponds to change(s) of state caused by the authorized cardholder for the payment card, may be implemented in several different ways. In an embodiment, confirmation that the change(s) of state is caused by an authorized cardholder may be achieved based on an identity authentication step associated with the payment card. For example, the cardholder may input a PIN, password, passcode or OTP at a POS terminal to execute a transaction, and successful authentication of the cardholder's identity at the POS terminal (for example, based on a server based authentication process implemented by the payment network or by the issuer network) may be treated as confirmation that the input(s) received from sensor(s) within payment card 400 immediately preceding the identity authentication have arisen as a result of change(s) of state of the payment card that have been caused by the authorized cardholder. Likewise, any other form of cardholder identity authentication including authentication mechanisms built into the payment card or external to the card, may be used to conclude that input(s) received from sensor(s) within payment card 400 immediately preceding the identity authentication have arisen as a result of change(s) of state of the payment card that have been caused by the authorized cardholder.

Generation of biometric identity signatures based on input(s) received at step 502 relies on one or more methods or algorithms for generating biometric identity signatures based on card handling data parameter(s)—which may include any card motion and/or card grip parameters. These methods or algorithms would be apparent to the skilled person. By using card handling data parameter(s) for generating biometric identity signatures, the method of FIG. 5 generates an identity signature that is difficult to consciously mimic or spoof.

At step 506, the generated identity biometric signature is retrievably stored by authentication signature generator 4082 in authentication signature database 410.

Figure 6:
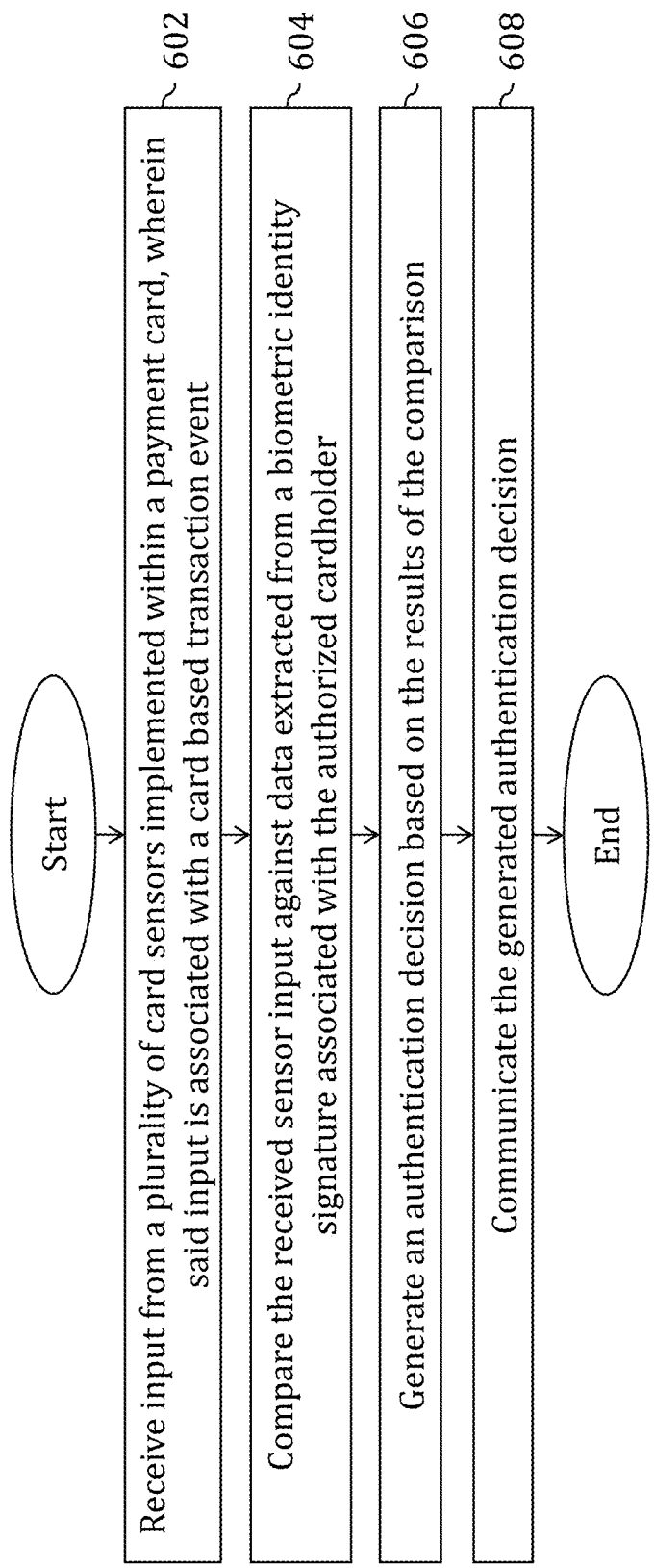
FIG. 6 is a flowchart illustrating a method for generating a cardholder identity authentication decision based on card handling data parameter(s) received from a payment card.

FIG. 6 illustrates a method for generating a cardholder identity authentication decision based on card handling data parameter(s) received from a payment card when the payment card is sought to be used for implementing a payment transaction.

Step 602 comprises receiving input(s) from one or more card sensors 402 to 406 implemented within payment card 400—wherein said input(s) are sensor inputs comprising card motion and/or card grip parameters detected by sensors 402 to 406 within a defined duration immediately preceding a card based transaction event (i.e. an event where payment card 400 is presented for the purposes of implementing a payment transaction). The input(s) at step 602 may be received at processor 408, or more specifically at one of authentication signature generator 4082 or card handling data comparator 4084. In the event input(s) at step 602 are received at authentication signature generator 4082, said authentication signature generator may generate a biometric identity signature based on the received inputs, for comparison against one or more biometric identity signatures that have been previously associated with an authorized cardholder for the payment card. The time duration preceding the card based transaction event that is used for selecting input(s) for the purposes of step 602 may be defined based on one or more predefined rules.

Step 604 comprises comparing sensor input(s) (or data extracted from an authentication signature that has been based on such sensor input(s)) received at step 602 against data extracted from a biometric identity signature that is associated with the authorized payment cardholder corresponding to payment card 400—wherein the biometric identity signature associated with the authorized payment cardholder has been generated in accordance with the method discussed above in connection with the method of FIG. 5. In an embodiment, the biometric authentication signature associated with the authorized payment cardholder is retrieved from authentication signature database 410. The comparison of step 604 is implemented at card handling data comparator 4084—which may be configured to apply one or more comparison methods that would be apparent to the skilled person.

Step 606 comprises generating an authentication decision based on the results of the comparison at step 604—which authentication decision may be generated by authentication decision generator 4086. Authentication decision generator 4086 may be configured such that (i) responsive to the comparison at step 604 resulting in an identity match, the generated authentication decision is an identity confirmation decision (i.e. an identity match decision) and (ii) responsive to the comparison at step 604 not resulting in an identity match, the generated authentication decision is an identity rejection decision (i.e. an identity non-match decision).

At step 608, the generated authentication decision is communicated (for example, by authentication decision communicator 412) to a POS terminal or reader (for example, POS terminal 204) at which payment card 400 has been presented for implementing a payment transaction.

Figure 7:
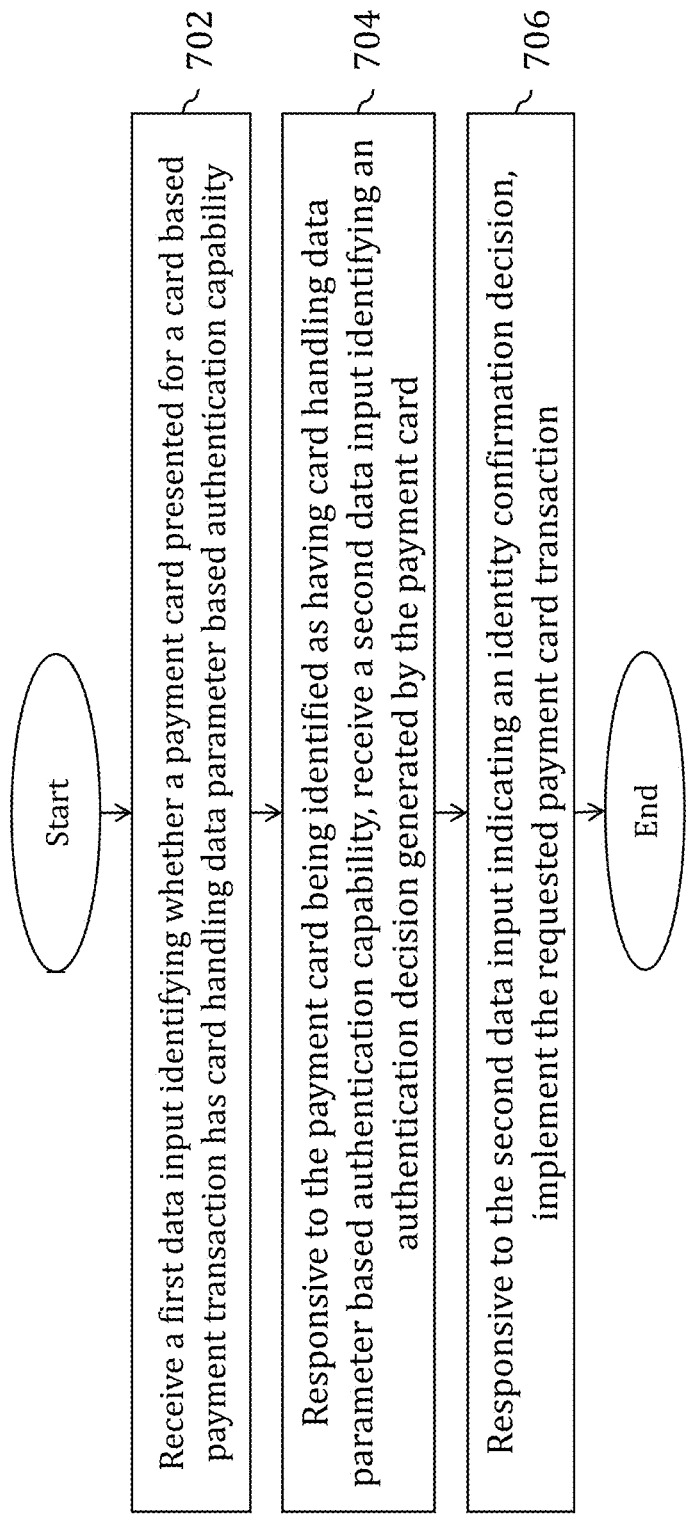
FIG. 7 is a flowchart illustrating a first method for transaction authentication based on a cardholder identity authentication decision generated based on card handling data parameter(s) received from a payment card.
Figure 9:
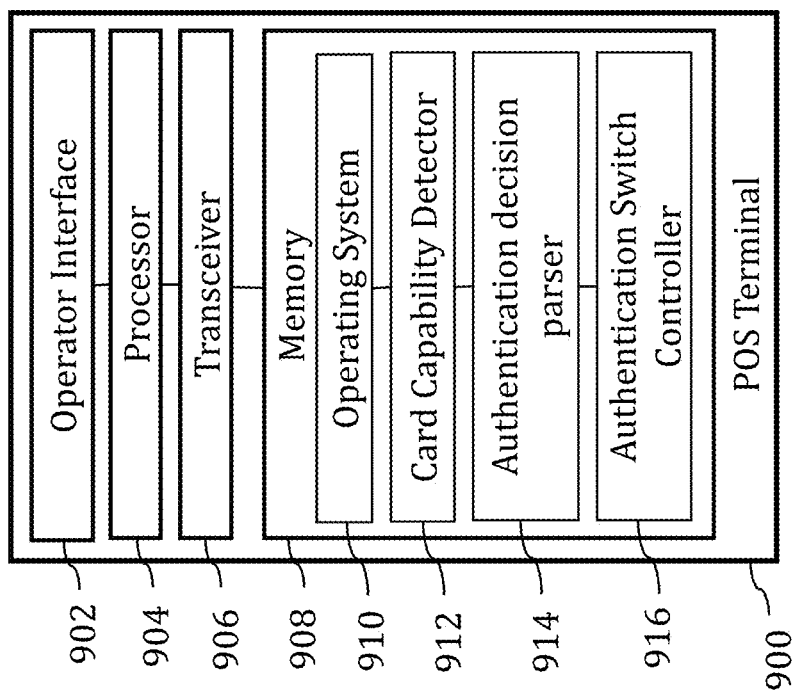
FIG. 9 illustrates a POS terminal configured to implement the methods of the present invention.

FIG. 7 illustrates a first method for transaction authentication based on a cardholder identity authentication decision generated based on card handling data parameter(s) received from a payment card. The method of FIG. 7 is implemented at a POS terminal at which payment card 400 is presented for implementing a payment transaction. An exemplary instance of a POS terminal 900 capable of implementing the method of FIG. 7 is illustrated in FIG. 9.

POS terminal 900 comprises an operator interface 902, processor 904, communication transceiver 906 and memory 908, which memory 908 may include transitory memory and/or non-transitory memory. In an exemplary embodiment, memory 908 may have stored therewithin, (i) an operating system 910 configured for managing device hardware and software resources and that provides common services for software programs implemented within POS terminal 900, (ii) card capability detector 912 configured to determine whether a payment card presented for implementing a payment transaction at payment terminal 900 is configured for identity authentication of the person presenting the payment card based on card handling data parameters received from sensors within the payment card, (iii) an authentication decision parser 914 configured to receive from authentication decision communicator 412 (within payment card 400) an authentication decision generated by authentication decision generator 4086, and (iv) an authentication switch controller 916 configured to select any subsequent authentication process flow required for implementing a payment transaction.

The method of FIG. 7 commences at step 702, wherein POS terminal 900 receives a first data input identifying whether a payment card presented for a card based payment transaction has card handling data parameter based authentication capabilities. The first data input may comprise user input received through an interface provided on POS terminal 900. Alternatively, the first data input may comprise data retrieved by the POS terminal 900 from a memory in payment card 400, which memory may be configured to store information describing the POS terminal's capabilities. The identification of payment card capabilities based on the first data input may in an embodiment be implemented by card capability detector 912.

Responsive to the presented payment card being identified as having card handling data parameter based authentication capability, step 704 comprises receiving a second data input identifying an authentication decision generated by the payment card based on card handling data parameter(s) measured by sensors within the payment card. The second data input may in an embodiment be received through data communication between authentication decision parser 914 (within POS terminal 900) and authentication decision communicator 412 within payment card 400.

In response to the second data input representing successful generation of an identity confirmation decision (i.e. a decision that the person presenting the payment card for implementing a payment transaction is the authorized cardholder) based on card handling data parameter(s) sensed by sensors within the card, step 706 comprises implementing the requested payment transaction for which the payment card has been presented at POS terminal 900—optionally without the requirement for any subsequent authentication steps.

Figure 8:
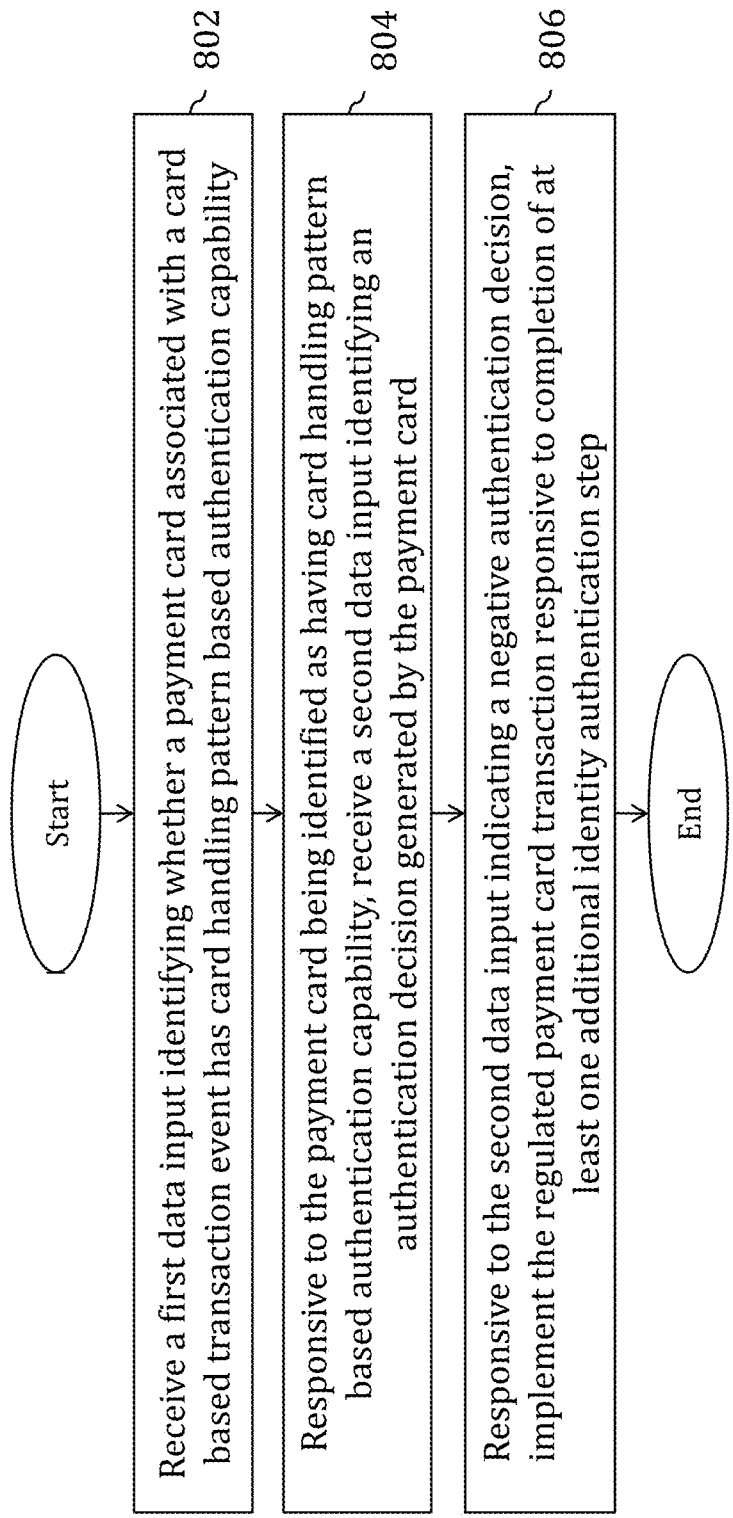
FIG. 8 is a flowchart illustrating a second method for transaction authentication based on a cardholder identity authentication decision generated based on card handling data parameter(s) received from a payment card.

FIG. 8 is a flowchart illustrating a second method for transaction authentication based on a cardholder identity authentication decision generated based on card handling data parameter(s) received from a payment card. The method of FIG. 8 is implemented at a POS terminal or reader at which payment card 400 is presented for implementing a payment transaction. An exemplary instance of a POS terminal 900 capable of implementing the method of FIG. 8 is illustrated in FIG. 9.

The method of FIG. 8 commences at step 802, wherein POS terminal 900 receives a first data input identifying whether a payment card presented for a card based payment transaction has card handling data parameter based authentication capabilities. The first data input may comprise user input received through an interface provided on POS terminal 900. Alternatively, the first data input may comprise data retrieved by the POS terminal 900 from a memory in payment card 400, which memory may be configured to store information describing the POS terminal's capabilities. The identification of payment card capabilities based on the first data input may in an embodiment be implemented by card capability detector 912.

Responsive to the payment card being identified as having card handling data parameter based authentication capability, step 804 comprises receiving a second data input identifying an authentication decision generated by the payment card based on card handling data parameter(s) measured by sensors within the payment card. The second data input may in an embodiment be received through data communication between authentication decision parser 914 (within POS terminal 900) and authentication decision communicator 412 within payment card 400.

At step 806, in response to the second data input establishing an identity rejection decision (i.e. a decision that the person presenting the payment card for implementing a payment transaction is not the authorized cardholder) based on card handling data parameter(s) sensed by sensors within the card, the requested payment transaction is only implemented responsive to completion of at least one additional identity authentication process flow (for example server based identity authentication based on a passcode or OTP input at the POS terminal). In an embodiment, the additional authentication process flow is triggered at step 806 by authentication switch controller 916 within POS terminal 900—which authentication switch controller 916 communicates with an authentication server (located within a payment network or in an issuer network) for the purposes of initiating the additional identity authentication process flow.

Figure 10:
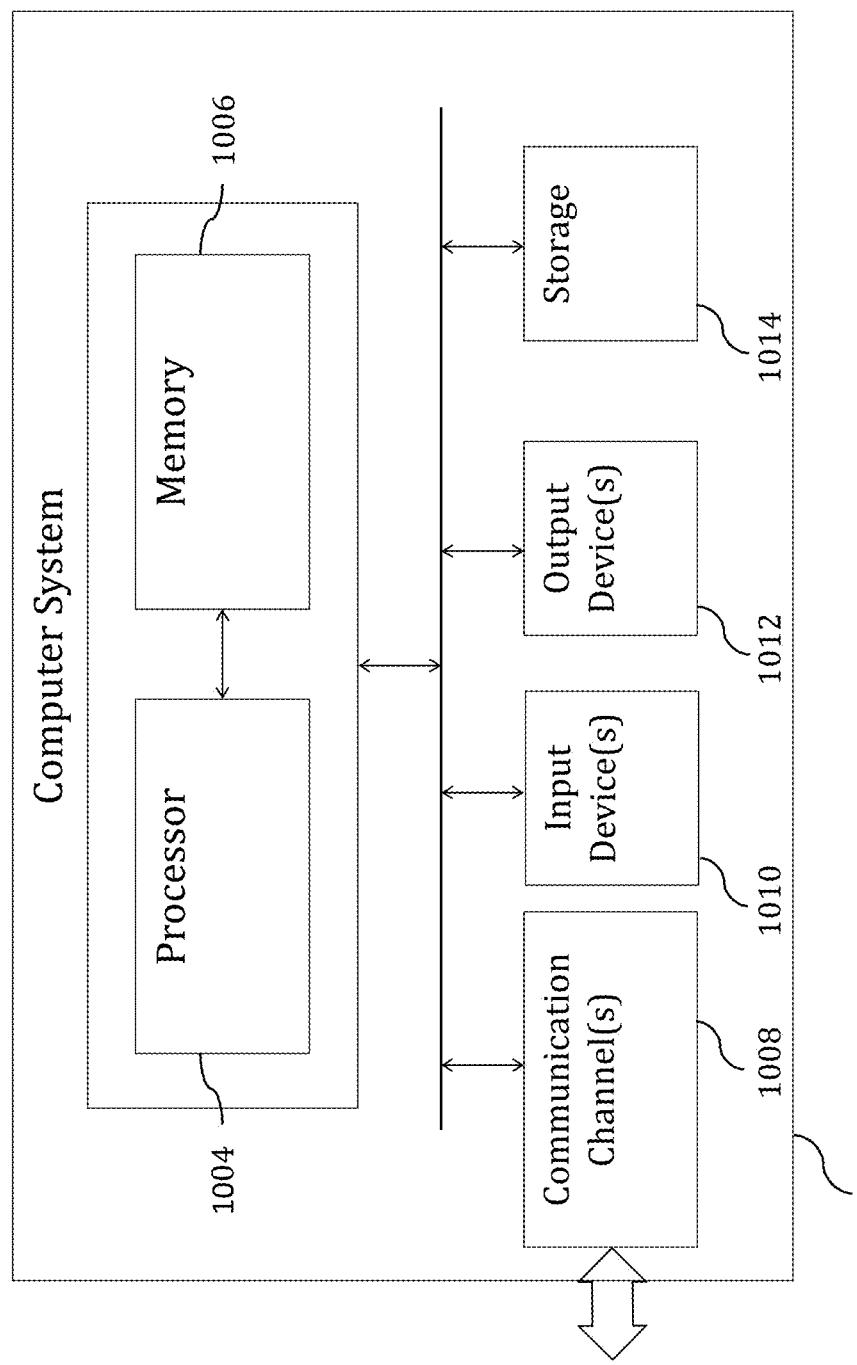
FIG. 10 illustrates an exemplary computer system according to which various embodiments of the present invention may be implemented.

FIG. 10 illustrates an exemplary computer system 1002 according to which various embodiments of the present invention may be implemented.

Computer system 1002 comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various software(s) executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above described systems and methods, it would be apparent that the present invention provides secure and non-spoofable methods of identity authentication, which additionally have the advantage of being non-intrusive and reducing the number of specific authentication steps that a user has to go through when initiating a payment transaction.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A payment card configured for payor identity authentication for one or more electronic payment transactions, the payment card comprising:
   one or more sensors used to acquire first card handling parameter data and second card handling parameter data associated with the payment card, wherein the first card handling parameter data and the second card handling parameter data comprise data corresponding to a motion of the payment card, a velocity of the payment card, a trajectory of the payment card, one or more grip characteristics of a grip applied to the payment card, or combinations thereof;
   a processor-implemented authentication signature generator, configured to:
      receive the first card handling parameter data;
      generate a biometric identity signature associated with an authorized cardholder based on the first card handling parameter data; and
      store the generated biometric identity signature in a memory;
   a processor-implemented card handling data comparator configured to:
      receive the second card handling parameter data;
      retrieve the biometric identity signature associated with the authorized cardholder from the memory;
      extract data from the retrieved biometric identity signature; and
      compare the second card handling parameter data with the extracted data from the retrieved biometric identity signature; and
   a processor-implemented authentication decision generator configured to generate an identity authentication decision based on the comparison of the second card handling parameter data with the extracted data from the retrieved biometric identity signature.

2. The payment card as claimed in claim 1, wherein the processor-implemented authentication decision generator is further configured to communicate the generated identity authentication decision to a payment card reader with which the payment card interfaces for the one or more electronic payment transactions.

3. The payment card as claimed in claim 1, wherein the one or more grip characteristics correspond to grip surfaces, grip surface area, grip pressure, grip duration, grip temperature, or combinations thereof.

4. The payment card as claimed in claim 1, wherein the one or more sensors comprise one or more accelerometers, one or more gyroscopes, one or more magnetometers, one or more altimeters, one or more Global Positioning System (GPS) receivers, one or more contact sensors, one or more grip sensors, one or more pressure sensors, one or more capacitive touch sensors, one or more galvanic skin response sensors, one or more temperature sensors, or combinations thereof.

5. The payment card as claimed in claim 1, wherein the processor-implemented authentication signature generator is configured to generate the biometric identity signature associated with the authorized cardholder in response to a confirmation that the first card handling parameter data corresponds to a change of state of the payment card caused by the authorized cardholder.

6. The payment card as claimed in claim 5, wherein the confirmation is based on a successful identity authentication of the authorized cardholder's identity at a payment card reader with which the payment card interfaces.

7. The payment card as claimed in claim 1, wherein the one or more sensors are used to acquire the second card handling parameter data within a defined duration immediately preceding a card-based transaction event.

8. The payment card as claimed in claim 1, wherein the identity authentication decision includes an identity match decision or an identity non-match decision.

9. A method for payor identity authentication for one or more electronic payment transactions using a payment card, comprising:
   acquiring first card handling parameter data associated with the payment card using one or more sensors of the payment card, wherein the first card handling parameter data comprises data corresponding to a motion of the payment card, a velocity of the payment card, a trajectory of the payment card, one or more grip characteristics of a grip applied to the payment card, or combinations thereof;
   generating a biometric identity signature associated with an authorized cardholder based on the first card handling parameter data;
   storing the generated biometric identity signature in a memory;
   acquiring second card handling parameter data associated with the payment card using the one or more sensors, wherein the second card handling parameter data comprises data corresponding to the motion of the payment card, the velocity of the payment card, the trajectory of the payment card, the one or more grip characteristics of a grip applied to the payment card, or combinations thereof;
   retrieving the biometric identity signature associated with the authorized cardholder from the memory;
   extracting data from the retrieved biometric identity signature;

comparing the second card handling parameter data with the extracted data from the retrieved biometric identity signature; and generating an identity authentication decision based on the comparison of the second card handling parameter data with the extracted data from the retrieved biometric identity signature.

10. The method as claimed in claim 9, further comprising communicating the generated identity authentication decision to a payment card reader with which the payment card interfaces for the one or more electronic payment transactions.

11. The method as claimed in claim 9, wherein the one or more grip characteristics correspond to grip surfaces, grip surface area, grip pressure, grip duration, grip temperature or combinations thereof.

12. The method as claimed in claim 9, wherein at the one or more sensors comprise any of an one or more accelerometers, one or more gyroscopes, one or more magnetometers, one or more altimeters, one or more Global Positioning System (GPS) receivers, one or more contact sensors, one or more grip sensors, one or more pressure sensors, one or more capacitive touch sensors, one or more galvanic skin response sensors, one or more temperature sensors, or combinations thereof.

13. The method as claimed in claim 9, wherein generating the biometric identity signature comprises generating the biometric identity signature associated with the authorized cardholder corresponding to the payment card in response to a confirmation that the first card handling parameter data corresponds to a change of state of the payment card that has been caused by the authorized cardholder.

14. The method as claimed in claim 13, wherein the confirmation is based on a successful identity authentication of the authorized cardholder's identity at a payment card reader with which the payment card interfaces.

15. The method as claimed in claim 9, wherein acquiring the second card handling parameter data comprises acquiring the second card handling parameter data associated with the payment card using the one or more sensors within a defined duration immediately preceding a card-based transaction event.

16. The method as claimed in claim 9, wherein the identity authentication decision includes an identity match decision or an identity non-match decision.

17. A computer program product for implementing pre-authorized payment transactions, comprising a non-transitory computer usable medium having computer readable program code embodied therein, the computer readable program code comprising instructions for implementing the steps of:

receiving first card handling parameter data associated with a payment card and acquired using one or more sensors of the payment card, wherein the first card handling parameter data comprises data corresponding to a motion of the payment card, a velocity of the payment card, a trajectory of the payment card, one or more grip characteristics of a grip applied to the payment card, or combinations thereof;

generating a biometric identity signature associated with an authorized cardholder based on the first card handling parameter data;

storing the generated biometric identity signature in a memory;

receiving second card handling parameter data associated with the payment card and acquired using the one or more sensors of the payment card, wherein the second card handling parameter data comprises data corresponding to the motion of the payment card, the velocity of the payment card, the trajectory of the payment card, the one or more grip characteristics of a grip applied to the payment card, or combinations thereof;

retrieving the biometric identity signature associated with the authorized cardholder from the memory;

comparing the second card handling parameter data with the extracted data from the retrieved biometric identity signature; and generating an identity authentication decision based on the comparison of the second card handling parameter data with the extracted data from the retrieved biometric identity signature.

* * * * *